Sept. 19, 1967   R. E. ROYCE   3,342,204
APPARATUS FOR VENTING A GASEOUS PORTION OF A PRESSURIZED FLUID
Filed June 18, 1965   2 Sheets-Sheet 1

INVENTOR.
ROBERT E. ROYCE
BY Sheridan and Ross
ATTORNEYS

INVENTOR.
ROBERT E. ROYCE
BY Sheridan and Ross
ATTORNEYS

United States Patent Office 3,342,204
Patented Sept. 19, 1967

3,342,204
APPARATUS FOR VENTING A GASEOUS PORTION OF A PRESSURIZED FLUID
Robert E. Royce, Englewood, Colo., assignor to Martin Marietta Corporation, New York, N.Y., a corporation of Maryland
Filed June 18, 1965, Ser. No. 464,989
4 Claims. (Cl. 137—199)

ABSTRACT OF THE DISCLOSURE

In a container of cryogenic liquid in a zero-gravity environment, the gas must be vented when the pressure builds up and the problem is to locate the gas phase in the container. The temperature of the gas phase is higher than the temperature of the liquid phase. A plurality of outlet valves are located around the container, each having a temperature sensor located near it. When an overpressure is indicated, a valve will be opened only when provided with a higher temperature signal from its associated temperature sensor, indicating the presence of gas phase in the vicinity of the valve.

---

This invention relates generally to a method and apparatus for determining the presence of a substantially gaseous portion of a pressurized fluid including a liquid and more particularly to a method and apparatus for determining the presence of a substantially gaseous portion of a pressurized fluid by supplying heat to a part of the pressurized fluid and sensing the temperature of said part of said pressurized fluid. The subject invention has particular application in a valve system for automatically venting gases such as cryogenic gases from a container in a weightless, or zero-gravity, environment to prevent over pressure formation inside the container.

In a cryogenic gas supply container during weightlessness, or zero gravity conditions, cryogenic gas and liquid phases of cryogenic gases, such as liquefied hydrogen and oxygen, for example, are not separated into a single liquid phase above the settled liquid phase, as in a gravity environment. Instead a plurality of bodies of liquid gas exist in more or less continuously changing random distribution throughout the cryogenic gas container. Due to the entry of heat into the best insulated cryogenic gas supply containers, evaporation of the high vapor pressure cryogenic liquid occurs continually and vapor or gas pressure build-up continually takes place. Continuous venting of gas at approximately the continual rate of evaporation of the cryogenic liquid is necessary, therefore, to prevent eventual bursting of the supply container. Venting of liquid is to be carefully avoided, however, to avoid wastage of the precious load of cryogenic gas supply. Consequently, an automatic vent valve, which can selectively distinguish between the presence of cryogenic gas phase and liquid phase, to vent only gas phase, is needed for efficient venting of the cryogenic gas supply container in a zero-gravity environment.

Accordingly, the principal object of this invention is to provide a method for determining the presence of a substantialy gaseous portion of a presurized fluid including a liquid under various environmental conditions and particularly under weightless, or zero-gravity, environmental conditions.

Another object of this invention is to provide a method and apparatus for distinguishing between a substantially gaseous portion and a substantially liquid portion of a pressurized fluid.

Another object of this invention is to provide a method and apparatus for venting one portion of a pressurized fluid including substantial gaseous portions and substantial liquid portions.

Another object of this invention is to provide a method for determining the presence of a substantial gaseous portion of a pressurized fluid including a liquid comprising the steps of supplying heat to a part of said pressurized fluid, sensing the temperature of said part of said pressurized fluid to which heat has been supplied, and generating a signal of a predetermined value when said part of said pressurized fluid to which heat has been applied is substantially of the gaseous phase.

Another object of this invention is to provide a means for determining the presence of a substantially gaseous portion of a pressurized fluid including a liquid, said means comprising a temperature sensing means and means for supplying heat to a part of said pressurized fluid adjacent said temperature sensing means, said temperature sensing means including means for generating a predetermined value when the part of said pressurized fluid adjacent said temperature sensing means is substantially of the gaseous phase.

Another object of this invention is to provide a selective gas valve which is regulated by auxiliary control circuitry to open only when gas can be exhausted therethrough, and remain closed if liquid would be exhausted therethrough, at a given instant in time.

Additional objects of this invention will become apparent from the following description, which is given primarily for purposes of illustration, and not limitation.

Stated in general terms and as applied to a pressurized container under weightless environmental conditions, the objects of this invention are attained by the use of a liquefied gas container vent valve system comprising a plurality of solenoid valves mounted at separated points on the container. Each solenoid valve is connected with a control circuit which includes a temperature sensor, such as a thermistor, capable of sensing the temperature differential or increase in temperature ocuring within a body substantially of the gas phase as compared with a substantial unchanged temperature existing within a body of liquid in the container and an overpressure switch which activates the control circuit when an overpressure develops inside the container. When the overpressure switch is closed, an electric current is sent to activate a trigger, such as a Schmitt trigger or a Zener trigger, which differentiates between the voltage sent when the temperature sensor senses the lower temperature liquid body or the higher temperature gas body adjacent the vent valve body or the higher temperature gas body adjacent the vent valve. Each solenoid vent valve capable of venting gas is opened by the trigger action while each solenoid vent valve which would vent liquid is kept closed by the trigger action. As soon as the overpressure condition is relieved, all of the open vent valves are closed by deactivation of the control circuit by the opening of the overpressure switch. A small electric heater is preferably positioned in close proximity with each thermistor and a constant current power supply can be included to supply a known and constant amount of power to each thermistor, if desired.

The principle of operation of the invention uses the fact that the gas or vapor phase of a liquefied gas, such as a cryogenic gas, exhibits a much lower rate of heat transfer from a source of heat into the interior of the body of gas than does a body of liquid, and thus the thermistor is heated to a higher temperature when surrounded by gas than when surrounded by a body of liquid exposed to the same source of heat. The source of heat employed for this purpose generally is a small electric heater, as described near the end of the paragraph immediately above, but can be heat or heat energy flowing through the wall or walls of the liquefied gas container. Thus, the pressure of a body of gas at the vent valve is sensed by the temperature of the gas which is higher than that of a body of liquid, if present at the same point. The temperature sensor, when exposed to this higher temperature condition, gives an electric signal to this effect. If the overpressure switch is closed, the higher voltage of the gas signal relative to the lower voltage liquid signal activates a trigger circuit, which in turn, activates the solenoid vent valve, or valves, to vent only gas, and no liquid, until the overpressure switch is opened due to relief of the overpressure condition inside the liquefied gas container.

A more detailed description of specific embodiments of the invention is given below with reference to the accompanying drawings, wherein.

Figure 1:
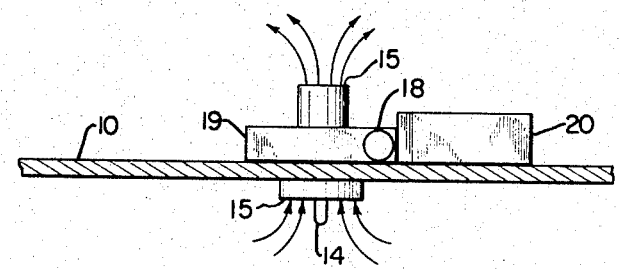
FIGURE 1 is a side elevational view showing the gas vent means together with auxiliary control circuit elements mounted on the wall of a liquefied gas container.
Figure 2:
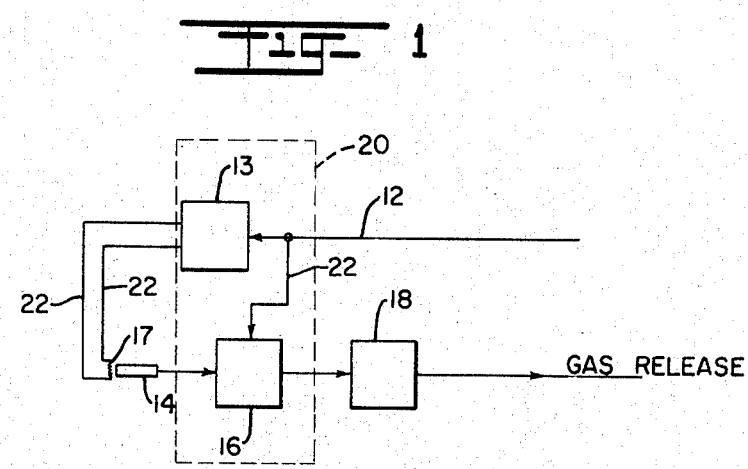
FIGURE 2 is a partial schematic block circuit diagram showing the auxiliary control circuit elements of the gas vent means of FIGURE 1.
Figure 3:
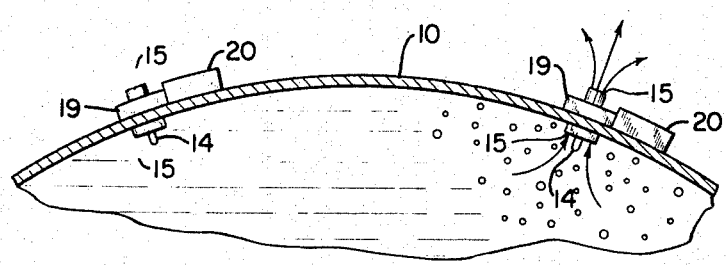
FIGURE 3 is a partial side elevational view showing several gas vent valves mounted in spaced relationship at separated points on the walls of a liquefied gas container.
Figure 4:
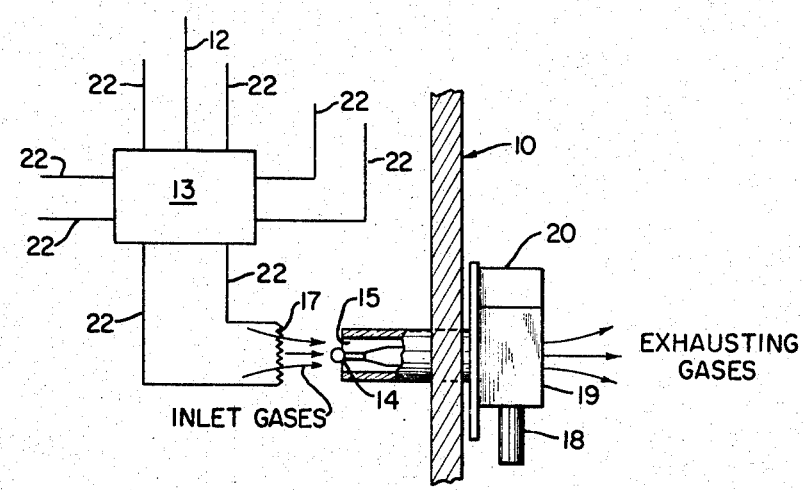
FIGURE 4 is a view similar to that of FIGURE 1, but showing a portion of the thermistor housing broken away and a small electric heater spaced from the thermistor and connected to a constant current power supply.
Figure 5:
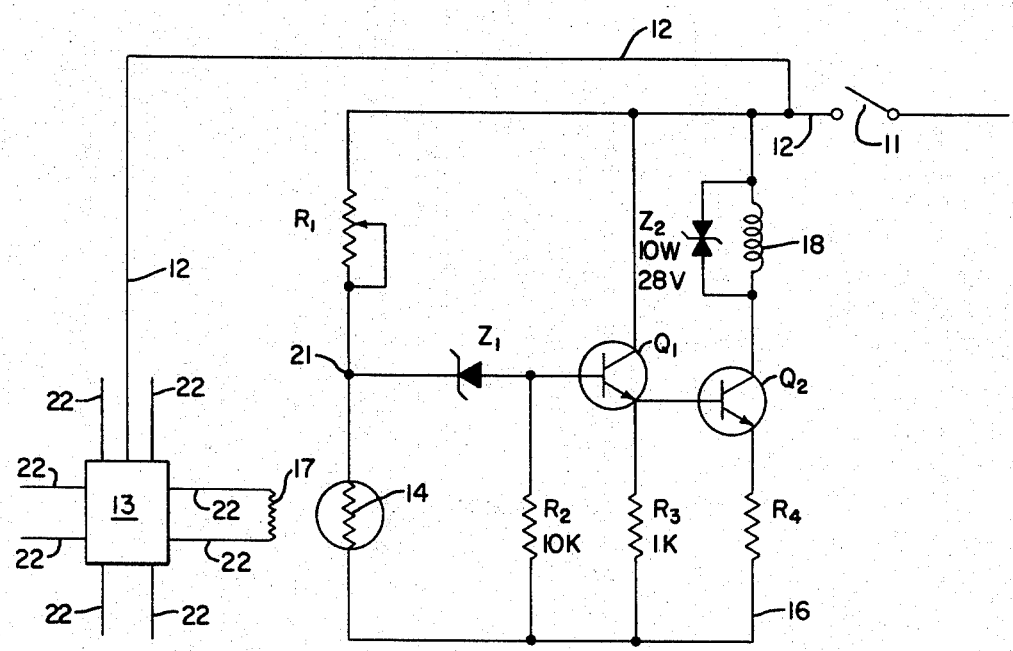
FIGURE 5 is a partial, schematic circuit diagram showing the auxiliary control circuit of the gas vent means shown in FIGURE 4.

Assuming that an overpressure condition exists inside the liquefied gas container defined by wall 10, containing bodies of liquid and gas phases at random distribution inside the container in a substantially zero-gravity, or weightless environment, overpressure switch 11, see FIGURE 5, is closed and power is applied to all of the gas vent valve trigger circuits such as through line 12 and to a heater control circuit or common, constant current power supply 13, if included. The power to the circuits may be 28 volts direct current, for example. Trigger circuit 16, which may be a Schmitt trigger or Zener trigger circuit, for example, includes a temperature sensor or thermistor 14, which is mounted in vent passageway 15 extending through side wall 10 and increases in resistance as its temperature is increased. It will be understood that thermistors which decrease in resistance with an increase in temperature may be used with suitable circuitry, if desired. However, this description will be limited to a discussion of a thermistor which increases in resistance with an increase in temperature. Heater control circuit 13 supplies constant current to a heating coil 17 mounted adjacent thermistor 14, if included in the circuit, through lines 22.

Heating coil 17 heats the body of gas or the body of liquid around it and thermistor element 14. In the presence of a body of gas a much higher temperature will be attained in thermistor element 14 than in the presence of a body of liquid, which would rapidly absorb heat from heating coil 17 and conduct it away from the heating coil and from element 14. Trigger circuit 16, which very readily differentiates between the relatively wide differential of temperature sensed by thermistor element 14 when a body of gas is present, as compared to the presence of a body of liquid, is set to trigger only at the higher temperature sensed by element 14 when surrounded by a body of gas and not in the presence of an environmental body of liquid.

The triggering of circuit 16 actuates solenoid coil 18 of solenoid valve 19 and gas is vented from the liquefied gas container through wall 10. Should a body of liquid drift around heating coil 17 and thermistor element 14, a sharp drop in temperature suddenly takes place, trigger circuit 16 suddenly becomes deactivated, solenoid coil 18 switches off and gas vent means or valve 19 closes before any liquid can be vented therethrough.

An example of an auxiliary control circuit, using a Zener trigger, instead of a Schmitt trigger, is shown in FIGURE 5. This circuit, which is compactly enclosed in a circuitry package or module 20, together with heater control circuit 13, includes thermistor 14, which increases its resistance with increasing temperature. As the resistance of thermistor 14 increases with increased temperature, the voltage at point 21, between variable resistance $R_1$ and thermistor 14, rises. When this voltage equals about 5.2 volts, for example, Zener diode $Z_1$ conducts current sharply. Current flows through Zener diode $Z_1$ into resistance $R_2$, which serves as a load resistance so that diode $Z_1$ snaps on. Current also flows to transistor $Q_1$, causing it to go to saturation. This resulting voltage drop at resistance $R_3$ causes transistor $Q_2$ to turn on, or become activated.

Transistor $Q_1$ is used as a power amplifier to insure adequate driving power to turn on power transistor $Q_2$. Resistance $R_4$ is chosen to handle the current of solenoid coil 18 of gas vent valve 19. Zener diode $Z_2$ is a back-to-back Zener diode employed to protect power transistor $Q_2$ from transient currents generated by solenoid coil 18. Variable resistance $R_1$ is used to set the trigger circuit.

In operation of the system using the Zener trigger circuit of FIGURE 5, an overpressure inside the liquefied gas container closes switch 11 and power is applied to all of the six, or so, gas vent valve circuits employed in spaced relationship at separate points on the walls 10 of the liquefied gas container. At those valves having thermistor elements 14 in a liquid phase environment, the temperature sensed thereby is low and the resistance of the thermistors 14 thereof is low. Under these conditions, the voltages at points 21 of these liquid sensing circuits are below about 5.2 volts and in each case, Zener diode $Z_1$ does not trigger or actuate solenoid coil 18 or gas vent valve 19. Thus, no venting of any kind takes place thereby preventing the normally undesired venting of the liquid phase.

However, at those valve circuits where the thermistor elements 14 are in bodies of substantially gaseous phase, the temperature sensed thereby is much higher and the resistances of the thermistors 14 are much higher than in the presence of bodies of liquid phase. In these valve circuits the voltages at points 21 are about equal to, or higher than about 5.2 volts due to the higher resistances of the thermistor elements 14. At these higher voltages Zener diodes $Z_1$ conduct current and trigger power transistors $Q_2$. Gas vent valves 19 are opened by energized solenoid coils 18 and solely gas venting at these valves takes place. Upon relief of the overpressure condition, switch 11 opens and electric power to all of the gas vent valves 19 is turned off so that none of them can vent gas or liquid.

Thus, venting of any sort cannot occur unless there is an overpressure condition. Venting of liquids cannot occur at any time. Venting of the gas phase occurs only from those gas vent valves having bodies of gas adjacent thereto. Other advantages of the gas vent valve system of the invention are apparent.

It will be understood that the small electric heater elements 17 and constant common current power supply 13 are optional. When omitted, it can be seen that upon receipt of a vent signal, switch 11 will close, supplying current to thermistor 14. The conductivity of the thermistor will vary depending on whether it is in a gaseous or liquid environment. The gas phase of the fluid will be at a slightly higher temperature than the liquid phase and by sensing this difference with the thermistor, the solenoids which operate the vents in the gas environment will be energized to open the vents whereas the solenoids which operate the vents in the liquid environment will not be energized. Thermistors which are sensitive to such minute temperature changes are quite expensive but such cost is partially offset by the elimination of the heater and its associated circuitry as discussed above. Also, the resultant reduction in weight due to the elimination of heater and its circuitry may be important in keeping the payload at acceptable limits for space travel.

Instead of venting gas, the system can be modified to vent or withdraw only liquid phase in other applications of the system of this invention by making changes in energization of the solenoid valve, for example, which are within the ordinary skill of the art.

From the foregoing, it will be readily apparent that the invention provides a method and apparatus for determining the presence of a substantially gaseous portion of a pressurized fluid including a liquid as well as a method and apparatus for venting the substantially gaseous portion of a pressurized fluid including a liquid. Further, it will be readily appreciated that the method and apparatus this invention provides is not only inexpensive but also a highly reliable way for preventing over-pressurization of a pressurizable container operating in a weightless environment without wasting any pressurized fluid in the liquid phase. Additionally, it will be apparent that the method and apparatus of this invention may be practiced with small, compact, light-weight components without the necessity of large electrical power requirements, a very desirable feature for space applications.

Obviously many other modifications and variations of the present gas vent valve system of the present invention are possible in the light of the teachings given hereinabove. It is, therefore, to be understood that, within the scope of the appended claims, the invention can be practiced otherwise than as specifically described.

What is claimed is:

1. A valve system for automatically venting gas from a liquefied gas container in a substantially zero-gravity environment which comprises temperature sensing means for sensing a temperature differential between the temperatures of the gas phase and the temperatures of the liquid phase in a container thereof, trigger circuit means coupled with the temperature sensing means for selective activation by a signal sent from the temperature sensing means to the trigger circuit means indicating that the temperature sensing means senses the temperature of the gas phase, valve means coupled with the trigger circuit means for withdrawal of gas phase from the container adjacent the temperature sensing means, an overpressure switch means coupled with the trigger circuit means for automatically enabling the trigger circuit means when an overpressure condition develops inside the liquefied gas container, and power source means for energizing the valve system.

2. A valve system for automatically venting gas from a liquefied gas container in a substantially zero-gravity environment which includes a plurality of valve units each of which comprises thermistor means for sensing a temperature differential between the temperatures of gas phase and the temperatures of the liquid phase in a container thereof, trigger circuit means coupled with the temperature sensing means for selective activation by a signal sent from the temperature sensing means to the trigger circuit means indicating that the temperature sensing means senses the temperature of the gas phase, valve means coupled with the trigger circuit means for withdrawal of gas phase from the container adjacent the temperature sensing means, resistance heat source means mounted adjacent the thermistor means for heating the environment of the thermistor means, an overpressure switch means coupled with the trigger circuit means for automatically enabling the trigger circuit means when an overpressure condition develops inside the liquefied gas container, power source means for energizing the valve system, and a common constant current power supply connected to all of the resistance heat source means.

3. A valve system for automatically venting one phase only from a container containing both liquid and gas phases in a substantially zero-gravity environment comprising: a plurality of spaced valve elements; a plurality of temperature sensing elements positioned in one-to-one corresponding relationship adjacent to each said valve element for sensing the temperature inside the container adjacent to each said valve element and providing an output signal that is a function of that temperature; trigger circuit means interconnecting each valve element and its corresponding temperature sensing element for receiving output signals from said temperature sensing element, distinguishing between signals indicative of the temperature of the two phases, and opening said corresponding valve element only when said signal indicates the presence of the phase to be vented; and trigger circuit enabling means for enabling said trigger circuit means upon receipt of a signal indicating the desirability of venting the container.

4. A valve system for automatically venting gas from a container containing both liquid and gas phases in a substantially zero-gravity environment comprising: a plurality of spaced valve elements; a plurality of temperature sensing elements positioned in one-to-one corresponding relationship adjacent to each said valve element for sensing the temperature inside the container adjacent to its corresponding valve and providing an output signal that is a function of that temperature; trigger circuit means interconnecting each valve element and its corresponding temperature sensing element for receiving said output signal from said temperature sensing element and opening its corresponding valve element only when said signal indicates the presence of the gas phase adjacent to said corresponding valve element; and overpressure sensing means for enabling said trigger circuit means when an overpressure condition exists inside the container.

References Cited

UNITED STATES PATENTS

| 2,580,016 | 12/1951 | Gilbert | 137—199 |
| 2,861,159 | 11/1953 | Seney | 137—392 X |
| 2,926,299 | 2/1960 | Rogoff | 137—392 X |

ALAN COHAN, *Primary Examiner.*